United States Patent
Lundberg et al.

(10) Patent No.: US 10,810,693 B2
(45) Date of Patent: Oct. 20, 2020

(54) METHOD AND APPARATUS FOR CROSS-REFERENCING IMPORTANT IP RELATIONSHIPS

(71) Applicants: Steven W. Lundberg, Edina, MN (US); Janal M. Kalis, Minneapolis, MN (US)

(72) Inventors: Steven W. Lundberg, Edina, MN (US); Janal M. Kalis, Minneapolis, MN (US)

(73) Assignee: Black Hills IP Holdings, LLC, Minneapolis, MN (US)

( * ) Notice: Subject to any disclaimer, the term of this patent is extended or adjusted under 35 U.S.C. 154(b) by 725 days.

(21) Appl. No.: 14/750,559

(22) Filed: Jun. 25, 2015

(65) Prior Publication Data
US 2015/0371349 A1    Dec. 24, 2015

Related U.S. Application Data

(63) Continuation of application No. 14/536,320, filed on Nov. 7, 2014, now abandoned, which is a continuation of application No. 11/915,718, filed as application No. PCT/US2006/020950 on May 30, 2006, now abandoned.

(60) Provisional application No. 60/685,759, filed on May 27, 2005.

(51) Int. Cl.
    *G06Q 50/18*  (2012.01)
    *G06F 16/242*  (2019.01)
    *G06Q 10/10*  (2012.01)

(52) U.S. Cl.
    CPC ......... *G06Q 50/184* (2013.01); *G06F 16/242* (2019.01); *G06Q 10/10* (2013.01)

(58) Field of Classification Search
    CPC ................................................... G06Q 50/184
    See application file for complete search history.

(56) References Cited

U.S. PATENT DOCUMENTS

| | | |
|---|---|---|
| 4,807,154 A | 2/1989 | Scully et al. |
| 4,868,733 A | 9/1989 | Fujisawa et al. |
| 5,297,039 A | 3/1994 | Kanaegami et al. |
| 5,329,447 A | 7/1994 | Leedom, Jr. |
| 5,404,506 A | 4/1995 | Fujisawa et al. |
| 5,410,646 A | 4/1995 | Tondevold et al. |

(Continued)

FOREIGN PATENT DOCUMENTS

| | | |
|---|---|---|
| AU | 2006272510 | 2/2012 |
| AU | 2012200701 B2 | 5/2014 |

(Continued)

OTHER PUBLICATIONS

Mapping patents to products: Why should you care?;Emma Roubtsov, Dec. 2009; cpaglobal.com (Year: 2009).*

(Continued)

*Primary Examiner* — Dennis W Ruhl
(74) *Attorney, Agent, or Firm* — Schwegman Lundberg & Woessner, P.A.

(57) ABSTRACT

This document discusses, among other things, a system and method to provide cross-referencing of important IP relationships. The system comprising software executing on a computing platform for displaying relationships between various domains of IP information selected from the group of claims, prosecution history, products, concepts or art.

17 Claims, 15 Drawing Sheets

(56) References Cited

U.S. PATENT DOCUMENTS

| | | |
|---|---|---|
| 5,530,852 A | 6/1996 | Meske et al. |
| 5,548,506 A | 8/1996 | Srinivasan |
| 5,548,753 A | 8/1996 | Linstead et al. |
| 5,553,226 A | 9/1996 | Kiuchi et al. |
| 5,555,408 A | 9/1996 | Fujisawa et al. |
| 5,557,515 A | 9/1996 | Abbruzzese et al. |
| 5,592,664 A | 1/1997 | Starkey |
| 5,623,679 A | 4/1997 | Rivette et al. |
| 5,623,681 A | 4/1997 | Rivette et al. |
| 5,644,740 A | 7/1997 | Kiuchi |
| 5,659,729 A | 8/1997 | Nielsen |
| 5,664,063 A | 9/1997 | Johnson et al. |
| 5,664,714 A | 9/1997 | Navarro et al. |
| 5,696,916 A | 12/1997 | Yamazaki et al. |
| 5,699,528 A | 12/1997 | Hogan |
| 5,721,910 A | 2/1998 | Unger et al. |
| 5,745,745 A | 4/1998 | Tada et al. |
| 5,754,840 A | 5/1998 | Rivette et al. |
| 5,758,328 A | 5/1998 | Giovannoli |
| 5,768,580 A | 6/1998 | Wical |
| 5,774,833 A | 6/1998 | Newman |
| 5,794,236 A | 8/1998 | Mehrle |
| 5,799,325 A | 8/1998 | Rivette et al. |
| 5,809,318 A | 9/1998 | Rivette et al. |
| 5,850,520 A | 12/1998 | Griebenow et al. |
| 5,870,745 A | 2/1999 | McCune |
| 5,895,468 A | 4/1999 | Whitmyer, Jr. |
| 5,903,881 A | 5/1999 | Schrader et al. |
| 5,907,837 A | 5/1999 | Ferrel et al. |
| 5,926,811 A | 7/1999 | Miller et al. |
| 5,953,726 A | 9/1999 | Carter et al. |
| 5,970,463 A | 10/1999 | Cave et al. |
| 5,991,756 A | 11/1999 | Wu |
| 5,991,780 A | 11/1999 | Rivette et al. |
| 6,006,221 A | 12/1999 | Liddy et al. |
| 6,014,663 A | 1/2000 | Rivette et al. |
| 6,038,561 A | 3/2000 | Snyder et al. |
| 6,049,801 A | 4/2000 | Whitmyer, Jr. |
| 6,055,538 A | 4/2000 | Kessenich et al. |
| 6,076,088 A | 6/2000 | Paik et al. |
| 6,182,062 B1 | 1/2001 | Fujisawa et al. |
| 6,182,078 B1 | 1/2001 | Whitmyer, Jr. |
| 6,216,128 B1 | 4/2001 | Di-Crescenzo et al. |
| 6,226,792 B1 | 5/2001 | Goiffon et al. |
| 6,263,335 B1 | 7/2001 | Paik et al. |
| 6,327,593 B1 | 12/2001 | Goiffon |
| 6,339,767 B1 | 1/2002 | Rivette et al. |
| 6,363,361 B1 | 3/2002 | Lundberg |
| 6,453,312 B1 | 9/2002 | Goiffon et al. |
| 6,499,026 B1 | 12/2002 | Rivette et al. |
| 6,502,081 B1 | 12/2002 | Wiltshire, Jr. et al. |
| 6,574,632 B2 | 6/2003 | Fox et al. |
| 6,662,178 B2 | 12/2003 | Lee |
| 6,665,670 B2 | 12/2003 | Winer et al. |
| 6,675,159 B1 | 1/2004 | Lin et al. |
| 6,678,692 B1 | 1/2004 | Hyatt |
| 6,694,331 B2 | 2/2004 | Lee |
| 6,751,621 B1 | 6/2004 | Calistri-Yeh et al. |
| 6,839,665 B1 | 1/2005 | Meyers |
| 6,847,966 B1 | 1/2005 | Sommer et al. |
| 6,847,979 B2 | 1/2005 | Allemang et al. |
| 6,885,999 B1 | 4/2005 | Corless |
| 6,889,223 B2 | 5/2005 | Hattori et al. |
| 6,941,553 B2 | 9/2005 | Eisler et al. |
| 6,970,842 B1 | 11/2005 | Ashby |
| 6,970,881 B1 | 11/2005 | Mohan et al. |
| 6,976,016 B2 | 12/2005 | Chang et al. |
| 6,981,007 B1 | 12/2005 | Whitmyer, Jr. |
| 7,003,516 B2 | 2/2006 | Dehlinger et al. |
| 7,016,852 B1 | 3/2006 | Lee |
| 7,016,895 B2 | 3/2006 | Dehlinger et al. |
| 7,024,408 B2 | 4/2006 | Dehlinger et al. |
| 7,054,854 B1 | 5/2006 | Hattori et al. |
| 7,054,856 B2 | 5/2006 | Won et al. |
| 7,080,067 B2 | 7/2006 | Nonomura et al. |
| 7,085,771 B2 | 8/2006 | Chung et al. |
| 7,158,983 B2 | 1/2007 | Willse et al. |
| 7,231,384 B2 | 6/2007 | Wu et al. |
| 7,231,386 B2 | 6/2007 | Nonomura et al. |
| 7,293,018 B2 | 11/2007 | Hattori et al. |
| 7,296,015 B2 | 11/2007 | Poltorak |
| 7,369,701 B2 | 5/2008 | Lundberg |
| 7,386,460 B1 * | 6/2008 | Frank .................... G06Q 10/10 705/310 |
| 7,483,829 B2 | 1/2009 | Murakami et al. |
| 7,493,253 B1 | 2/2009 | Ceusters et al. |
| 7,523,126 B2 | 4/2009 | Rivette et al. |
| 7,680,733 B1 | 3/2010 | Lundberg |
| 7,716,226 B2 | 5/2010 | Barney |
| 7,881,937 B2 | 2/2011 | Hasan et al. |
| 7,966,328 B2 | 6/2011 | Germeraad et al. |
| 7,996,753 B1 | 8/2011 | Chan et al. |
| 8,078,545 B1 | 12/2011 | Zilka et al. |
| 8,161,025 B2 | 4/2012 | Lundberg et al. |
| 8,442,814 B2 | 5/2013 | Ceusters et al. |
| 8,589,413 B1 | 11/2013 | Mohan et al. |
| 8,812,292 B2 | 8/2014 | Ceusters et al. |
| 9,904,726 B2 | 2/2018 | Lundberg |
| 2001/0042064 A1 | 11/2001 | Davis et al. |
| 2002/0004775 A1 | 1/2002 | Kossovsky et al. |
| 2002/0029208 A1 | 3/2002 | Josephson |
| 2002/0035499 A1 | 3/2002 | Germeraad et al. |
| 2002/0035571 A1 | 3/2002 | Coult |
| 2002/0042784 A1 | 4/2002 | Kerven et al. |
| 2002/0065677 A1 | 5/2002 | Grainger et al. |
| 2002/0078090 A1 | 6/2002 | Hwang et al. |
| 2002/0091541 A1 | 7/2002 | Lundberg |
| 2002/0103654 A1 | 8/2002 | Poltorak |
| 2002/0107896 A1 | 8/2002 | Ronai |
| 2002/0111824 A1 | 8/2002 | Grainger |
| 2002/0111941 A1 | 8/2002 | Roux et al. |
| 2002/0111953 A1 | 8/2002 | Snyder |
| 2002/0129015 A1 | 9/2002 | Caudill et al. |
| 2002/0138465 A1 | 9/2002 | Lee et al. |
| 2002/0138474 A1 | 9/2002 | Lee |
| 2002/0138475 A1 | 9/2002 | Lee |
| 2002/0143742 A1 | 10/2002 | Nonomura et al. |
| 2002/0147711 A1 | 10/2002 | Hattori et al. |
| 2002/0147738 A1 | 10/2002 | Reader et al. |
| 2002/0161733 A1 | 10/2002 | Grainger |
| 2002/0163541 A1 | 11/2002 | Williams |
| 2002/0174131 A1 | 11/2002 | Winer et al. |
| 2002/0184234 A1 | 12/2002 | Lundberg |
| 2003/0004843 A1 | 1/2003 | Frain |
| 2003/0004936 A1 | 1/2003 | Grune et al. |
| 2003/0026459 A1 | 2/2003 | Won et al. |
| 2003/0033295 A1 | 2/2003 | Adler et al. |
| 2003/0033333 A1 | 2/2003 | Nishino et al. |
| 2003/0046307 A1 * | 3/2003 | Rivette ............. G06F 17/30011 |
| 2003/0050915 A1 | 3/2003 | Allemang et al. |
| 2003/0074354 A1 | 4/2003 | Lee et al. |
| 2003/0115191 A1 | 6/2003 | Copperman et al. |
| 2003/0167181 A1 | 9/2003 | Lundberg et al. |
| 2003/0187832 A1 | 10/2003 | Reader |
| 2003/0195764 A1 | 10/2003 | Baker et al. |
| 2003/0212706 A1 | 11/2003 | Shih |
| 2003/0220891 A1 | 11/2003 | Fish |
| 2003/0225749 A1 | 12/2003 | Cox et al. |
| 2004/0006457 A1 | 1/2004 | Dehlinger et al. |
| 2004/0006459 A1 | 1/2004 | Dehlinger et al. |
| 2004/0006547 A1 | 1/2004 | Dehlinger et al. |
| 2004/0006558 A1 | 1/2004 | Dehlinger et al. |
| 2004/0006594 A1 | 1/2004 | Boyer et al. |
| 2004/0015481 A1 | 1/2004 | Zinda |
| 2004/0024733 A1 | 2/2004 | Won et al. |
| 2004/0024739 A1 | 2/2004 | Copperman et al. |
| 2004/0044688 A1 | 3/2004 | Brudz et al. |
| 2004/0049498 A1 | 3/2004 | Dehlinger et al. |
| 2004/0054672 A1 | 3/2004 | Tsuchitani et al. |
| 2004/0059736 A1 | 3/2004 | Willse et al. |
| 2004/0059994 A1 | 3/2004 | Fogel et al. |
| 2004/0078192 A1 | 4/2004 | Poltorak |
| 2004/0078365 A1 | 4/2004 | Poltorak |
| 2004/0083206 A1 | 4/2004 | Wu et al. |

(56) References Cited

U.S. PATENT DOCUMENTS

| | | |
|---|---|---|
| 2004/0088332 A1 | 5/2004 | Lee et al. |
| 2004/0103112 A1 | 5/2004 | Colson et al. |
| 2004/0122841 A1 | 6/2004 | Goodman et al. |
| 2004/0133566 A1 | 7/2004 | Ishiguro et al. |
| 2004/0177068 A1 | 9/2004 | Beretich, Jr. et al. |
| 2004/0181417 A1 | 9/2004 | Piller et al. |
| 2004/0181427 A1 | 9/2004 | Stobbs et al. |
| 2004/0186705 A1 | 9/2004 | Morgan et al. |
| 2004/0186738 A1 | 9/2004 | Reisman |
| 2004/0199400 A1 | 10/2004 | Lundberg |
| 2004/0260569 A1 | 12/2004 | Bell et al. |
| 2005/0004806 A1 | 1/2005 | Lin et al. |
| 2005/0005239 A1 | 1/2005 | Richards et al. |
| 2005/0010555 A1 | 1/2005 | Gallivan |
| 2005/0060170 A1 | 3/2005 | Kummamura et al. |
| 2005/0060303 A1 | 3/2005 | Wu et al. |
| 2005/0060306 A1 | 3/2005 | Hattori et al. |
| 2005/0080656 A1 | 4/2005 | Crow et al. |
| 2005/0108652 A1 | 5/2005 | Beretich et al. |
| 2005/0114763 A1 | 5/2005 | Nonomura et al. |
| 2005/0119995 A1 | 6/2005 | Lee |
| 2005/0120011 A1 | 6/2005 | Dehlinger et al. |
| 2005/0131882 A1 | 6/2005 | Beretich et al. |
| 2005/0144177 A1 | 6/2005 | Hodes |
| 2005/0154673 A1 | 7/2005 | Fellenstein et al. |
| 2005/0182755 A1 | 8/2005 | Tran |
| 2005/0198026 A1 | 9/2005 | Dehlinger et al. |
| 2005/0210008 A1 | 9/2005 | Tran et al. |
| 2005/0210009 A1 | 9/2005 | Tran |
| 2005/0210042 A1 | 9/2005 | Goedken |
| 2005/0216898 A1 | 9/2005 | Powell et al. |
| 2005/0228684 A1 | 10/2005 | Pogodin et al. |
| 2005/0234738 A1 | 10/2005 | Hodes |
| 2005/0246194 A1 | 11/2005 | Lundberg |
| 2005/0256734 A1 | 11/2005 | Clikeman |
| 2005/0289524 A1 | 12/2005 | McGinnes |
| 2006/0026174 A1 | 2/2006 | Lundberg et al. |
| 2006/0026203 A1 | 2/2006 | Tan et al. |
| 2006/0036451 A1 | 2/2006 | Lundberg et al. |
| 2006/0036452 A1 | 2/2006 | Williams |
| 2006/0036453 A1 | 2/2006 | Williams |
| 2006/0036529 A1 | 2/2006 | Williams |
| 2006/0036632 A1 | 2/2006 | Williams |
| 2006/0036635 A1 | 2/2006 | Williams |
| 2006/0074991 A1 | 4/2006 | Lussier et al. |
| 2006/0085478 A1 | 4/2006 | Landau et al. |
| 2006/0106847 A1 | 5/2006 | Eckardt, III et al. |
| 2006/0150074 A1 | 7/2006 | Zellner |
| 2006/0161562 A1 | 7/2006 | McFarland et al. |
| 2006/0173903 A1 | 8/2006 | Zimmerman et al. |
| 2006/0173920 A1 | 8/2006 | Adler et al. |
| 2006/0190449 A1 | 8/2006 | Lundberg et al. |
| 2006/0190807 A1 | 8/2006 | Tran |
| 2006/0212402 A1 | 9/2006 | Lundberg et al. |
| 2006/0212480 A1 | 9/2006 | Lundberg et al. |
| 2006/0218188 A1 | 9/2006 | Duncan et al. |
| 2006/0218491 A1 | 9/2006 | Grossman et al. |
| 2006/0224412 A1 | 10/2006 | Frank et al. |
| 2006/0225000 A1 | 10/2006 | Albrecht et al. |
| 2006/0235811 A1 | 10/2006 | Fairweather |
| 2006/0287971 A1 | 12/2006 | Armstrong |
| 2007/0011154 A1 | 1/2007 | Musgrove et al. |
| 2007/0057967 A1 | 3/2007 | Armstrong |
| 2007/0061384 A1 | 3/2007 | Harrington et al. |
| 2007/0067297 A1 | 3/2007 | Kublickis |
| 2007/0073748 A1 | 3/2007 | Barney |
| 2007/0136116 A1 | 6/2007 | Germeraad et al. |
| 2007/0174041 A1 | 7/2007 | Yeske |
| 2007/0198578 A1 | 8/2007 | Lundberg et al. |
| 2007/0208669 A1 | 9/2007 | Rivette et al. |
| 2007/0208719 A1 | 9/2007 | Tran |
| 2007/0288256 A1 | 12/2007 | Speier |
| 2008/0005103 A1 | 1/2008 | Ratcliffe et al. |
| 2008/0016069 A1 | 1/2008 | Holt |
| 2008/0077570 A1 | 3/2008 | Tang et al. |
| 2008/0104032 A1 | 5/2008 | Sarkar |
| 2008/0154848 A1 | 6/2008 | Haslam et al. |
| 2008/0195601 A1 | 8/2008 | Ntoulas et al. |
| 2008/0216013 A1 | 9/2008 | Lundberg et al. |
| 2008/0306952 A1 | 12/2008 | Lynn et al. |
| 2009/0083049 A1 | 3/2009 | Sciarrino et al. |
| 2009/0228578 A1 | 9/2009 | Demers et al. |
| 2009/0259459 A1 | 10/2009 | Ceusters et al. |
| 2010/0005094 A1 | 1/2010 | Poltorak |
| 2010/0131513 A1 | 5/2010 | Lundberg et al. |
| 2010/0235337 A1 | 9/2010 | Shanahan et al. |
| 2011/0055192 A1 | 3/2011 | Tang et al. |
| 2011/0072014 A1 | 3/2011 | Lundberg et al. |
| 2011/0153509 A1 | 6/2011 | Lundberg et al. |
| 2011/0179032 A1 | 7/2011 | Ceusters et al. |
| 2012/0096027 A1 | 4/2012 | Coult |
| 2012/0109642 A1 | 5/2012 | Stobbs et al. |
| 2012/0130993 A1 | 5/2012 | Lundberg et al. |
| 2012/0284199 A1 | 11/2012 | Lundberg |
| 2013/0144895 A1 | 6/2013 | Cameron |
| 2015/0134549 A1 | 5/2015 | Lundberg et al. |
| 2018/0137194 A1 | 5/2018 | Lundberg |

FOREIGN PATENT DOCUMENTS

| | | |
|---|---|---|
| EP | 0638870 A1 | 2/1995 |
| GB | 2156112 A | 10/1985 |
| GB | 2260007 A | 3/1993 |
| WO | WO-98/16890 A1 | 4/1998 |
| WO | WO-0054185 A1 | 9/2000 |
| WO | WO-02/080039 A1 | 10/2002 |
| WO | WO-2006/015110 A2 | 2/2006 |
| WO | WO-2006/015110 A3 | 2/2006 |
| WO | WO-2006/128183 A2 | 11/2006 |
| WO | WO-2006/128183 A3 | 11/2006 |
| WO | WO-2007/014341 A2 | 2/2007 |
| WO | WO-2007/014341 A3 | 2/2007 |
| WO | WO-2007/014341 C2 | 2/2007 |

OTHER PUBLICATIONS

"U.S. Appl. No. 10/710,656, Non-Final Office Action dated Jan. 17, 2007", 16 pgs.

"U.S. Appl. No. 10/710,656, Response filed Nov. 13, 2006 to Restriction Requirement dated Oct. 13, 2006", 6 pgs.

"U.S. Appl. No. 10/710,656, Restriction Requirement dated Oct. 13, 2006", 9 pgs.

"U.S. Appl. No. 10/915,265, Advisory Action dated Jul. 31, 2008", 3 pgs.

"U.S. Appl. No. 10/915,265, Final Office Action dated Jul. 10, 2007", 26 pgs.

"U.S. Appl. No. 10/915,265, Final Office Action dated Jul. 14, 2008", 23 pgs.

"U.S. Appl. No. 10/915,265, Non-Final Office Action dated Jan. 22, 2007", 15 pgs.

"U.S. Appl. No. 10/915,265, Non-Final Office Action dated Apr. 13, 2009", 27 pgs.

"U.S. Appl. No. 10/915,265, Non-Final Office Action dated Jun. 2, 2010", 29 pgs.

"U.S. Appl. No. 10/915,265, Non-Final Office Action dated Nov. 5, 2008", 27 pgs.

"U.S. Appl. No. 10/915,265, Non-Final Office Action dated Dec. 28, 2007", 25 pgs.

"U.S. Appl. No. 10/915,265, Response filed Feb. 5, 2009 to Non-Final Office Action dated Nov. 5, 2008", 11 pgs.

"U.S. Appl. No. 10/915,265, Response filed Apr. 28, 2008 to Non-Final Office Action dated Dec. 28, 2007", 14 pgs.

"U.S. Appl. No. 10/915,265, Response filed May 18, 2007 to Noon Final Office Action dated Jan. 22, 2007", 9 pgs.

"U.S. Appl. No. 10/915,265, Response filed Jul. 18, 2008 to Final Office Action dated Jul. 14, 2008", 17 pgs.

"U.S. Appl. No. 10/915,265, Response filed Sep. 1, 2010 to Non-Final Office Action dated Jun. 2, 2010", 12 pgs.

"U.S. Appl. No. 10/915,265, Response filed Oct. 10, 2007 to Final Office Action filed Jul. 10, 2007", 15 pgs.

(56) References Cited

OTHER PUBLICATIONS

"U.S. Appl. No. 10/915,265, Response filed Nov. 13, 2006 to Restriction Requirement dated Oct. 11, 2006", 5 pgs.
"U.S. Appl. No. 10/915,265, Restriction Requirement dated Oct. 13, 2006", 10 pgs.
"U.S. Appl. No. 11/494,278, Final Office Action dated Mar. 23, 2009", 21 pgs.
"U.S. Appl. No. 11/494,278, Final Office Action dated Apr. 1, 2010", 20 pgs.
"U.S. Appl. No. 11/494,278, Non-Final Office Action dated Oct. 8, 2009", 21 pgs.
"U.S. Appl. No. 11/494,278, Non-Final Office Action dated Mar. 5, 2008", 14 pgs.
"U.S. Appl. No. 11/494,278, Notice of Allowance dated May 3, 2011", 12 pgs.
"U.S. Appl. No. 11/494,278, Notice of Allowance dated Dec. 15, 2011", 14 pgs.
"U.S. Appl. No. 11/494,278, Notice of Non-Compliant Amendment dated Jun. 7, 2010", 2 pgs.
"U.S. Appl. No. 11/494,278, Preliminary Amendment filed Oct. 30, 2007", 6 pgs.
"U.S. Appl. No. 11/494,278, Response filed Feb. 10, 2010 to Non-Final Office Action dated Oct. 8, 2009", 8 pgs.
"U.S. Appl. No. 11/494,278, Response filed Jun. 2, 2010 to Final Office Action dated Apr. 1, 2010", 7 pgs.
"U.S. Appl. No. 11/494,278, Response filed Jun. 5, 2008 to Non-Final Office Action dated Mar. 5, 2008", 12 pgs.
"U.S. Appl. No. 11/494,278, Response filed Jun. 9, 2010 to Notice of Non-Compliant Amendment dated Jun. 7, 2010", 7 pgs.
"U.S. Appl. No. 11/494,278, Response filed Jun. 23, 2009 to Final Office Action dated Mar. 23, 2009", 8 pgs.
"U.S. Appl. No. 11/888,632, Amendment filed Jun. 12, 2012", 8 pgs.
"U.S. Appl. No. 11/888,632, Appeal Brief filed Jun. 4, 2015", 16 pgs.
"U.S. Appl. No. 11/888,632, Decision on Pre-Appeal Brief mailed Mar. 9, 2012", 2 pgs.
"U.S. Appl. No. 11/888,632, Final Office Action dated Sep. 8, 2014", 12 pgs.
"U.S. Appl. No. 11/888,632, Final Office Action dated Oct. 19, 2011", 9 pgs.
"U.S. Appl. No. 11/888,632, Non-Final Office Action dated Jan. 19, 2011", 12 pgs.
"U.S. Appl. No. 11/888,632, Non-Final Office Action dated Jan. 24, 2014", 12 pgs.
"U.S. Appl. No. 11/888,632, Pre-Appeal Brief Request filed Feb. 21, 2012", 4 pgs.
"U.S. Appl. No. 11/888,632, Response filed Jun. 24, 2014 to Non-Final Office Action dated Jan. 24, 2014", 9 pgs.
"U.S. Appl. No. 11/888,632, Response filed Jul. 19, 2011 to Non-Final Office Action dated Jan. 19, 2011", 8 pgs.
"U.S. Appl. No. 11/888,632, Response filed Dec. 7, 2010, to Restriction Requirement dated Jul. 7, 2010", 7 pgs.
"U.S. Appl. No. 11/888,632, Restriction Requirement dated Jul. 7, 2010", 5 pgs.
"U.S. Appl. No. 11/915,718, Advisory Action dated Feb. 15, 2012", 3 pgs.
"U.S. Appl. No. 11/915,718, Final Office Action dated Dec. 30, 2011", 13 pgs.
"U.S. Appl. No. 11/915,718, Non-Final Office Action dated May 26, 2011", 9 pgs.
"U.S. Appl. No. 11/915,718, Non-Final Office Action dated Jul. 7, 2014", 17 pgs.
"U.S. Appl. No. 11/915,718, Notice of Non-Compliant Amendment dated Oct. 6, 2011", 2 pgs.
"U.S. Appl. No. 11/915,718, Preliminary Amendment filed Nov. 27, 2007", 2 pgs.
"U.S. Appl. No. 11/915,718, Response filed Feb. 8, 2012 to Final Office Action dated Dec. 30, 2011", 13 pgs.

"U.S. Appl. No. 11/915,718, Response filed Oct. 11, 2011 to Notice of Non-Compliant Amendment dated Oct. 6, 2011", 4 pgs.
"U.S. Appl. No. 11/915,718, Response filed Sep. 26, 2011 to Non-Final Office Action dated May 26, 2011", 9 pgs.
"U.S. Appl. No. 12/605,030, Final Office Action dated May 21, 2012", 10 pgs.
"U.S. Appl. No. 12/605,030, Final Office Action dated Jul. 16, 2014", 16 pgs.
"U.S. Appl. No. 12/605,030, Non-Final Office Action dated Oct. 7, 2011", 12 pgs.
"U.S. Appl. No. 12/605,030, Non-Final Office Action dated Nov. 7, 2013", 16 pgs.
"U.S. Appl. No. 12/605,030, Response filed Feb. 7, 2012 to Non-Final Office Action dated Oct. 7, 2011", 9 pgs.
"U.S. Appl. No. 12/605,030, Response Filed May 7, 2014 to Non-Final Office Action dated Nov. 7, 2013", 8 pgs.
"U.S. Appl. No. 12/605,030, Response filed Oct. 22, 2012 to Final Office Action dated May 21, 2012", 8 pgs.
"U.S. Appl. No. 12/658,113, Non-Final Office Action dated Feb. 28, 2011", 26 pgs.
"U.S. Appl. No. 12/958,113, Final Office Action dated Aug. 8, 2011", 26 pgs.
"U.S. Appl. No. 12/958,113, Response filed Feb. 8, 2012 to Final Office Action dated Aug. 8, 2011", 12 pgs.
"U.S. Appl. No. 12/958,113, Response filed May 20, 2011 to Non-Final Office Action dated Feb. 28, 2011", 13 pgs.
"U.S. Appl. No. 13/365,062, Non-Final Office Action dated Mar. 19, 2015", 14 pgs.
"U.S. Appl. No. 13/365,062, Non-Final Office Action dated Apr. 30, 2014", 13 pgs.
"U.S. Appl. No. 13/365,062, Non-Final Office Action dated Jul. 3, 2012", 20 pgs.
"U.S. Appl. No. 13/365,062, Non-Final Office Action dated Aug. 19, 2013", 14 pgs.
"U.S. Appl. No. 13/365,062, Non-Final Office Action dated Oct. 9, 2014", 13 pgs.
"U.S. Appl. No. 13/365,062, Non-Final Office Action dated Nov. 30, 2012", 19 pgs.
"U.S. Appl. No. 13/365,062, Response filed Feb. 9, 2015 to Non-Final Office Action dated Oct. 9, 2014", 6 pgs.
"U.S. Appl. No. 13/365,062, Response filed May 29, 2013 to Non-Final Office Action dated Nov. 30, 2012", 8 pgs.
"U.S. Appl. No. 13/365,062, Response filed Jun. 19, 2015 to Non-Final Office Action dated Mar. 19, 2015", 9 pgs.
"U.S. Appl. No. 13/365,062, Response filed Sep. 2, 2014 to Non-Final Office Action dated Jul. 30, 2014", 8 pgs.
"U.S. Appl. No. 13/365,062, Response filed Oct. 3, 2012 to Non Final Office Action dated Jul. 3, 2012", 8 pgs.
"U.S. Appl. No. 13/365,062, Response filed Dec. 19, 2013 to Non Final Office Action dated Aug. 19, 2013", 10 pgs.
"U.S. Appl. No. 13/464,598, Appeal Brief filed Jan. 28, 2016", 19 pgs.
"U.S. Appl. No. 13/464,598, Appeal Decision mailed Jul. 31, 2017", 18 pgs.
"U.S. Appl. No. 13/464,598, Examiner Interview Summary dated May 1, 2014", 3 pgs.
"U.S. Appl. No. 13/464,598, Final Office Action dated Jul. 28, 2015", 38 pgs.
"U.S. Appl. No. 13/464,598, Non-Final Office Action dated Mar. 16, 2015", 51 pgs.
"U.S. Appl. No. 13/464,598, Non-Final Office Action dated Dec. 4, 2013", 26 pgs.
"U.S. Appl. No. 13/464,598, Notice of Allowance dated Oct. 12, 2017", 5 pgs.
"U.S. Appl. No. 13/464,598, Response filed Apr. 5, 2014 to Non-Final Office Action dated Dec. 4, 2013", 44 pgs.
"U.S. Appl. No. 13/464,598, Response filed Jul. 16, 2015 to Non-Final Office Action dated Mar. 16, 2015", 24 pgs.
"U.S. Appl. No. 13/464,598, Response filed Oct. 2, 2017 to Final Office Action dated Jul. 28, 2017", 17 pgs.
"U.S. Appl. No. 14/536,320, Non-Final Office Action dated Mar. 25, 2015", 9 pgs.

(56) References Cited

OTHER PUBLICATIONS

"U.S. Appl. No. 15/722,868, Preliminary Amendment filed Jan. 19, 2018", 8 pgs.
"Australian Application Serial No. 2006272510, Office Action dated Oct. 22, 2010", 3 pgs.
"Australian Application Serial No. 2006272510, Response filed Oct. 6, 2011 to Office Action dated Oct. 22, 2011", 15 pgs.
"Australian Application Serial No. 2012200701, Office Action dated Aug. 21, 2013", 2 pgs.
"Australian Application Serial No. 2012200701, Response filed Dec. 12, 2013 to Office Action dated Aug. 21, 2013", 33 pgs.
"Casefinder Manual", [Online]. Retrieved from the Internet: <URL: http://web.archive.org/web/20040419155315/http://www.casefinder.com/downloads/manual-5.00.pdf>, (Archived Apr. 19, 2004), 2, 35-42, 51.
"East Text Search Training", (Jan. 2000), 155 pgs.
"European Application Serial No. 05775617.3, Extended European Search Report dated Mar. 24, 2009", 8 pgs.
"European Application Serial No. 06800464.7, Amendment filed Mar. 21, 2011", 7 pgs.
"European Application Serial No. 068004647, Examination Notification Art. 94(3) dated May 2, 2014", 8 pgs.
"European Application Serial No. 06800464.7, Extended European Search Report dated Aug. 24, 2010", 8 pgs.
"European Application Serial No. 06800464.7, Response filed Sep. 11, 2014 to Office Action dated May 2, 2014", 16 pgs.
"International Application Serial No. PCT/US2005/026768, Demand mailed Mar. 7, 2007", 9 pgs.
"International Application Serial No. PCT/US2005/026768, International Preliminary Report on Patentability dated Mar. 29, 2007", 8 pgs.
"International Application Serial No. PCT/US2005/026768, International Search Report dated Mar. 7, 2007", 5 pgs.
"International Application Serial No. PCT/US2005/026768, Written Opinion dated Mar. 7, 2007", 5 pgs.
"International Application Serial No. PCT/US2006/020950, International Preliminary Report on Patentability dated Dec. 13, 2007", 6 pgs.
"International Application Serial No. PCT/US2006/020950, International Search Report dated Feb. 5, 2007", 2 pgs.
"International Application Serial No. PCT/US2006/020950, Written Opinion dated Feb. 5, 2007", 4 pgs.
"International Application Serial No. PCT/US2006/029456, International Preliminary Report on Patentability dated Feb. 7, 2008", 9 pgs.
"International Application Serial No. PCT/US2006/029456, International Search Report dated Oct. 1, 2007", 5 pgs.
"International Application Serial No. PCT/US2006/029456, Written Opinion dated Oct. 1, 2007", 7 pgs.
"Notice from the European Patent Office dated Oct. 1, 2007 concerning business methods", Official Journal of the European Patent Office, 30(11), (Nov. 1, 2007), 592-593.
"PatentPleeze Overview", [Online]. Retrieved from the Internet: <URL: http://web.archive.org/web/20060824063540/web.ncf.ca/ex133/patnow.pdf>, (Archived Aug. 24, 2006), 33 pgs.
"Using Citation Link", [Online]. Retrieved from the Internet: <URL: http://web.archive.org/web/20041204224023/www.delphion.com/help/citelink_help>, (Archived Dec. 4, 2004), 10 pgs.
"What is PAIR?", [Online]. Retrieved from the Internet: <URL: http://web.archive.org/web/20040606224528/pair.uspto.gov/cgi-bin/final/help.pl>, (Archived Jun. 6, 2004), 9 pgs.
Broekstra, Joen, et al., "Sesame: A Generic Architecture for Storing and Querying RDF and RDF Schema", Administrator Nederland b.v., Amersfoort, The Netherlands; Faculty of Sciences, Vrije University, Amsterdam, The Netherlands, http://www.aidministrator.nl/, (2002), 16 pgs.
Davis, Lee, "The Strategic Use of Patents in International Business", The 28th Annual EIBA Conference, Athens Greece, (Dec. 2002), 1-27.

East, T. W, "Patent Claims—How to Keep Track of Them", IEEE Aerospace and Electronic Systems Magazine, 10(8), (Aug. 1995), 32-33.
Fall, C.J., et al., "Literature Survey: Issue to be considered in the automatic classifications of patents", World Intellectual Property Organization, (Oct. 2002), 1-64.
Gruber, T R, et al., "A Translation Approach to Portable Ontology Specifications", KSL Report KSL-92-71, Knowledge Systems Laboratory, Stanford University, (1993), 24 pgs.
Hoover, A. E, "Electronic Filing Top 10 Wish List, IP Today", pp. 22-23, (Jul. 2006), 2 pgs.
Hutzell, Paula, "Image File Wrapper (IFW) Processing", USPTO PPT Presentation, (May 8, 2003), 25 pgs.
Indukuri, Kishore Varma, et al., "Similarity Analysis of Patent Claims Using Natural Language Processing Techniques", International Conference on Computational Intelligence and Multimedia Applications, (2007), 169-175.
Larkey, L. S, "A Patent Search and Classification System", Proceedings of the 4th ACM Conference of Digital Libraries, (1999), 179-187.
Larkey, Leah S, et al., "Collection Selection and Results Merging with Topically Organized U.S. Patents and TREC Data", Proceedings of the Ninth International Conference on Information and Knowledge Management, (2000), 8 pgs.
Luo, Si, et al., "A Semisupervised Learning Method to Merge Search Engine results", ACM Transactions on Information Systems, vol. 21, No. 4, (Oct. 2002), 457-491.
Mahesh, K., "Ontology Development for Machine Translation: Ideology and Methodology", Technical Report MCCS-96-292, Computing Research Laboratory, New Mexico State University, (1996), 87 pgs.
Mase, H., et al., "Proposal of Two-Stage Patent Retrieval Method Considering the Claim Structure", ACM Transactions on Asian Language Information Processing (TALIP), 4(2), (Jun. 2005), 190-206.
Quinn, B., "Internet Access to Patent Application Files Now Available", Press Release, [Online]. Retrieved from the Internet, (Aug. 2, 2004), 1 pg.
Sheremetyeva, S., et al., "Generating Patent Claims from Interactive Input", Proceedings of the 8th International Workshop on Natural Language Generation (INLG'96), (Jun. 1996), 61-70.
Sheremetyeva, S., et al., "Knowledge Elicitation for Authoring Patent Claims", IEEE Computer, 29(7), (Jul. 1996), 57-63.
Sheremetyeva, S., "Natural Language Analysis of Patent Claims", Proceedings of the ACL-2003 Workshop on Patent Corpus Processing, (2003), 66-73.
Sheremetyeva, S., et al., "On Creating Metadata with Authoring Tools", Proceedings of the ECAI 2002 Workshop on Semantic Authoring, Annotation and Knowledge Markup(SAAKM), (Jul. 2002), 22-26.
Von-Wun, Soo, et al., "A Cooperative Multi-Agent Platform for Invention based on Ontology and Patent Document Analysis", The 9th International Conference on Computer Supported Cooperative Work in Design Proceedings, (2005), 411-416.
Woods, W. A, "Conceptual Indexing: A Better Way to Organize Knowledge", Sun Microsystems, Inc., (1997), 99 pgs.
U.S. Appl. No. 11/915,718, filed Jul. 14, 2008, Method and Apparatus for Cross-Referencing Important IP Relationships.
U.S. Appl. No. 14/536,320, filed Nov. 7, 2014, Method and Apparatus for Cross-Referencing Important IP Relationships.
U.S. Appl. No. 13/464,598 U.S. Pat. No. 9,904,726, filed May 4, 2012, Apparatus and Method for Automated and Assisted Patent Claim Mapping and Expense Planning.
U.S. Appl. No. 15/722,868, filed Oct. 2, 2017, Apparatus and Method for Automated and Assisted Patent Claim Mapping and Expense Planning.
U.S. Appl. No. 15/722,868, Final Office Action dated Jan. 28, 2020, 23 pgs.
U.S. Appl. No. 15/722,868, Non Final Office Action dated Oct. 4, 2019, 19 pgs.
U.S. Appl. No. 15/722,868, Response filed Jan. 6, 2020 to Non Final Office Action dated Oct. 4, 2019, 12 pgs.

(56) References Cited

OTHER PUBLICATIONS

U.S. Appl. No. 15/722,868, Response filed Mar. 30, 2020 to Final Office Action dated Jan. 28, 2020, 11 pgs.

U.S. Appl. No. 15/722,868, Advisory Action dated Apr. 8, 2020, 3 pgs.

U.S. Appl. No. 15/722,868, Non Final Office Action dated May 18, 2020, 26 pgs.

Paul, Stockwell, "Use of an automatic content analysis tool: A technique for seeing both local and global scope", Int. J. Human-Computer Studies 67, (2009), 424-436.

U.S. Appl. No. 15/722,868, Examiner Interview Summary dated Aug. 27, 2020, 3 pgs.

U.S. Appl. No. 15/722,868, Notice of Allowance dated Sep. 3, 2020, 22 pgs.

U.S. Appl. No. 15/722,868, Response filed Aug. 18, 2020 to Non Final Office Action dated May 18, 2020, 12 pgs.

* cited by examiner

| TOP LEVEL TABS | | | |
|---|---|---|---|
| MATTERS | ETC... | | CLIENT |

Fig. 2

DISPLAY SCREEN:

CLIENT AND BIBLIOGRAPHIC INFORMATION — 300
— 302

| PRODUCT SPACE — 304 | CONCEPT ONTOLOGY — 306 | CLAIMS — 308 | REFERENCES — 310 | PATENTS/APPS — 312 |
|---|---|---|---|---|
| PRODUCT SPACE | PROTECTION | STATUS | CLAIMS | FILE NUMBERS |
| GADGET A | SELECTED | PENDING | 1 | NA |
| FEATURE A | NONE | NA | 3 | |
| TECHNOLOGY A | BROAD | ISSUED | 4 | FILE NUMBERS |

Fig. 3

| CLIENT NAME AND BIBLIOGRAPHIC INFO | | |
|---|---|---|
| PRODUCT SPACE | CONCEPT ONTOLOGY | CLAIMS | REFERENCES |

USE CONCEPT ONTOLOGY HERE

Fig. 4

CLIENT NAME AND BIBLIOGRAPHIC INFO.

| PRODUCT SPACE | CONCEPT ONTOLOGY | CLAIMS | REFERENCES |
|---|---|---|---|

| | PRODUCT SPACE | STATUS | CONCEPTS |
|---|---|---|---|
| | GADGET A | PENDING | CONCEPT A |
| | FEATURE A | NA | CONCEPT B |
| | TECHNOLOGY A | ISSUED | CONCEPT C |

| APPLICATION/PATENT | CLAIMS |
|---|---|
| CASE A | CLAIM 1 |
| CASE B | 2 |
| CASE C | 3 |

*Fig. 5*

CLIENT NAME AND BIBLIOGRAPHIC INFO.

| PRODUCT SPACE 604 | CONCEPT ONTOLOGY 606 | CLAIMS 608 | REFERENCES 602 | | |
|---|---|---|---|---|---|
| CITED REFERENCES | CITED AGAINST | PATENT/APP | ALLEGED TEACHING 610 | APPLICANT'S ARGUMENTS 612 | STATUS 614 |
| REFERENCE A | CLAIM X | MATTER # | [LINK TO TEXT] | [LINK TO] TEXT] | ARGUMENT REJECTED |
|  | CLAIM Y | MATTER # | [LINK TO TEXT] | [LINK TO] TEXT] | ARGUMENT REJECTED |
|  | CLAIM Z | MATTER # | [LINK TO TEXT] | [LINK TO] TEXT] | ARGUMENT REJECTED |
| REFERENCE B | CLAIM A | MATTER # | [LINK TO TEXT] | [LINK TO] TEXT] | ARGUMENT REJECTED |
| REFERENCE C | CLAIM B | MATTER # | [LINK TO TEXT] | [LINK TO] TEXT] | ARGUMENT REJECTED |
| REFERENCE D | CLAIM C | MATTER # | [LINK TO TEXT] | [LINK TO] TEXT] | ARGUMENT REJECTED |

Fig. 6

[FILE BIBLIOGRAPHIC DATA, LIKE FIP]

| CLAIMS | PROSECUTION | PRODUCT SPACE | CONCEPTS | CITED REFERENCES |
|---|---|---|---|---|
| CLAIM SET 1 (INITIAL FILING) | PRODUCT SPACE | RELATED CLAIMS | CLAIM SET 2 (DATE FILED) | PRODUCT SPACE / RELATED CLAIMS |
| 1. (STATUS) CLAIM LANGUAGE | FEATURE A | CLAIM 1, SET 2 (COULD BE MORE THAN ONE) | 1. (STATUS) CLAIM LANGUAGE | FEATURE A / CLAIM 1, SET 2 |
| 2. (STATUS) CLAIM LANGUAGE | FEATURE B | CLAIM 7, SET 2 ETC... | 2. (STATUS) CLAIM LANGUAGE | FEATURE B / CLAIM 7, SET 2 |
| 3. (STATUS) CLAIM LANGUAGE | FEATURE C | | 3. (STATUS) CLAIM LANGUAGE | FEATURE C / ETC... |
| 4. (STATUS) CLAIM LANGUAGE | FEATURE D | | 4. (STATUS) CLAIM LANGUAGE | FEATURE D |

Fig. 7

MATTER [FILE BIBLIOGRAPHIC DATA]

| CLAIMS | PROSECUTION | PRODUCT SPACE | CONCEPTS | CITED REFERENCES |

(CONDENSED VIEW)

| CLAIM SET 1 (INITIAL FILING) | AMEND-MENT STATUS | EXAM STATUS | ART CITED | REASONS FOR PTO POSITION | APPLICANT'S ARGUMENTS | CLAIM SET 2 (DATE FILED) | AMEND-MENT STATUS | CURRENT EXAM STATUS | ART CITED | REASONS FOR PTO POSITION | APPLICANT'S ARGUMENTS |
|---|---|---|---|---|---|---|---|---|---|---|---|
| 1 | U | A | NONE | | | 1 | F | A | NONE | [LINK TO TEXT] | [LINK TO TEXT] |
| 2 | U | R | REFERENCE A, B, C | [LINK TO TEXT] | [LINK TO TEXT] | 2 | C | R | NA | [LINK TO TEXT] | [LINK TO TEXT] |
| 3 | U | R | REFERENCE A | [LINK TO TEXT] | [LINK TO TEXT] | 3 | A | A | NONE | [LINK TO TEXT] | [LINK TO TEXT] |
| 4 | U | R | REFERENCE C | [LINK TO TEXT] | [LINK TO TEXT] | 4 | A | A | NONE | [LINK TO TEXT] | [LINK TO TEXT] |
| | | | | | | 5 | U | A | NONE | [LINK TO TEXT] | [LINK TO TEXT] |
| | | | | | | 6 | U | R | REFERENCE B | [LINK TO TEXT] | [LINK TO TEXT] |
| | | | | | | 7 | U | O | NONE | [LINK TO TEXT] | [LINK TO TEXT] |

A=ALLOWED  R=REJECTED  U=UNAMENDED  O=OBJECTED TO

Fig. 8

SCREEN DISPLAY:
[FILE BIBLIOGRAPHIC DATA]

| CLAIMS | PROSECUTION | PRODUCT SPACE | CONCEPTS | CITED REFERENCES |

(EXPANDED VIEW)

| CLAIM SET 1 (INITIAL FILING) | AMEND-MENT STATUS | EXAM STATUS | ART CITED | REASONS FOR PTO POSITION | APPLICANT'S ARGUMENTS | CLAIM SET 2 (DATE FILED) | AMEND-MENT STATUS | CURRENT EXAM STATUS | ART CITED | REASONS FOR PTO POSITION | APPLICANT'S ARGUMENTS |
|---|---|---|---|---|---|---|---|---|---|---|---|
| 1. A METHOD COMPRISING X, Y, Z | U | A | NONE | [LINK TO TEXT] | [LINK TO TEXT] | 1. A METHOD COMPRISING X,Y,Z | F | A | NONE | [LINK TO TEXT] | [LINK TO TEXT] |
| 2. XXXX | U | R | REFERENCE A, B, C | [LINK TO TEXT] | [LINK TO TEXT] | 2. XXXx | C | R | NA | [LINK TO TEXT] | [LINK TO TEXT] |
| 3. YYYY | U | R | REFERENCE A | [LINK TO TEXT] | [LINK TO TEXT] | 3. YYYY | A | A | NONE | [LINK TO TEXT] | [LINK TO TEXT] |
| 4. ZZZ | U | R | REFERENCE C | [LINK TO TEXT] | [LINK TO TEXT] | 4. zzzzzz | A | A | NONE | [LINK TO TEXT] | [LINK TO TEXT] |
| | | | | | | 5. aaaaa | U | A | NONE | [LINK TO TEXT] | [LINK TO TEXT] |
| | | | | | | 6. ccccc | U | R | REFERENCE B | [LINK TO TEXT] | [LINK TO TEXT] |
| | | | | | | 7. ddddd | U | O | NONE | [LINK TO TEXT] | [LINK TO TEXT] |

Fig. 9

SCREEN DISPLAY:

[FILE BIBLIOGRAPHIC DATA]

| CLAIMS | PROSECUTION | PRODUCT SPACE | CONCEPTS | CITED REFERENCES |
|---|---|---|---|---|
| PRODUCT SPACE HIERARCHY | PROTECTION | STATUS | CLAIMS APPLICABLE | |
| GADGET A | SELECTED | PENDING | 1, 2, 3 | |
| FEATURE A | NONE | NA | NONE | |
| TECHNOLOGY A | BROAD | ISSUED | 4 | |

Fig. 10

SCREEN DISPLAY:

[FILE BIBLIOGRAPHIC DATA]

| CLAIMS | PROSECUTION | PRODUCT SPACE | CONCEPTS | CITED REFERENCES |
|---|---|---|---|---|
| | CLAIM 1 | CLAIM 2 | CLAIM 3 | CLAIM 4 |
| CONCEPT A | X | | | X |
| CONCEPT B | ✓ | ✓ | | |
| CONCEPT C | | | X | X |
| CONCEPT D | | | X | X |

Fig. 11

[FILE BIBLIOGRAPHIC DATA] — 1200

| CLAIMS | PROSECUTION — 1206 | PRODUCT SPACE — 1208 | CONCEPTS — 1210 | CITED REFERENCES — 1202, 1212 |
|---|---|---|---|---|
| CITED REFERENCES — 1204 | CITED AGAINST | ALLEGED TEACHING | APPLICANT'S ARGUMENTS | STATUS |
| REFERENCE A | CLAIM x | [LINK TO TEXT] | [LINK TO] TEXT | ARGUMENT REJECTED |
|  | CLAIM y | [LINK TO TEXT] | [LINK TO] TEXT | ARGUMENT REJECTED |
|  | CLAIM z | [LINK TO TEXT] | [LINK TO] TEXT | ARGUMENT REJECTED |
| REFERENCE B | CLAIM a | [LINK TO TEXT] | [LINK TO] TEXT | ARGUMENT REJECTED |
| REFERENCE C | CLAIM b | [LINK TO TEXT] | [LINK TO] TEXT | ARGUMENT REJECTED |
| REFERENCE D | CLAIM c | [LINK TO TEXT] | [LINK TO] TEXT | ARGUMENT REJECTED |

*Fig. 12*

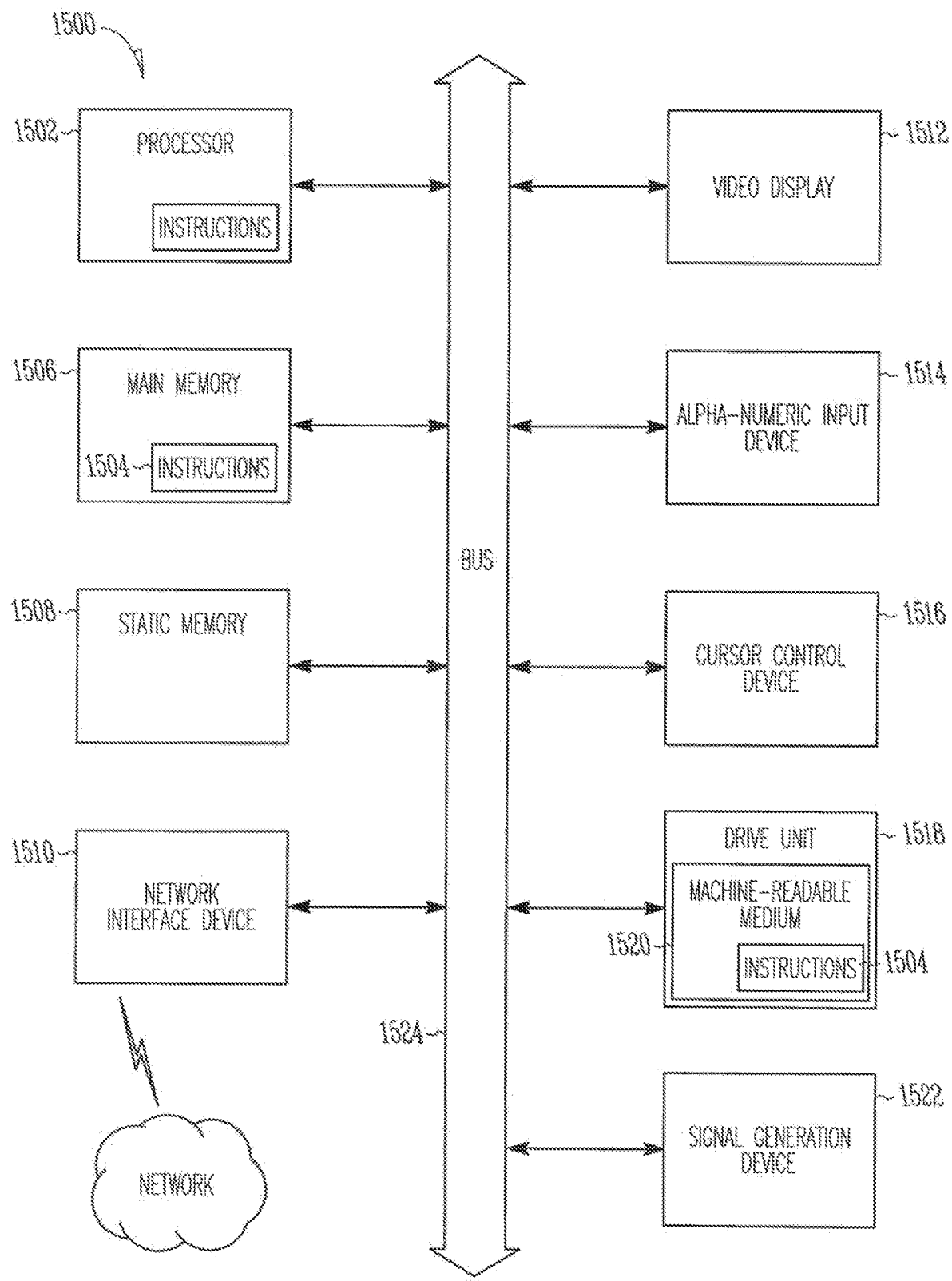

METHOD AND APPARATUS FOR CROSS-REFERENCING IMPORTANT IP RELATIONSHIPS

This application is a continuation of and claims the benefit of priority under 35 U.S.C. § 120 to U.S. patent application Ser. No. 14/536,320, filed on Nov. 7, 2014, which is a continuation of and claims the benefit of priority under 35 U.S.C. § 120 to U.S. patent application Ser. No. 11/915,718, filed on Jul. 14, 2008, which is a U.S. National Stage Filing under 35 U.S.C. 371 from International Application No. PCT/US2006/020950, filed on May 30, 2006, and published as WO 2006/128183 A1 on Nov. 30, 2006, which claims the benefit of priority under 35 U.S.C. § 119(e) to U.S. Provisional Patent Application No. 60/685,759, filed on May 27, 2005, which are hereby incorporated by reference herein in their entireties.

TECHNICAL FIELD

This patent document pertains generally to data collection and presentation, and more particularly, but not by way of limitation, to a method and apparatus for cross-referencing important intellectual property relationships.

BACKGROUND

In a patent application, claims define the scope of an issued patent, and consequently, the claims also define the scope and breadth of the associated intellectual rights or property. A system and method to concisely catalog and describe pending and issue claims may assist a practitioner when providing advice to a client, drafting well-formed claims, and avoiding unnecessary costs during prosecution.

BRIEF DESCRIPTION OF THE DRAWINGS

In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

FIG. 2 is a display screen illustrating an example embodiment of a home node.

FIG. 3 is a display screen illustrating an example embodiment of a client child node and a product space grandchild node.

FIG. 4 is a display screen illustrating an example embodiment of a client child node and a concept ontology grandchild node.

FIG. 5 is a display screen illustrating an example embodiment of a client child node and a claims grandchild node.

FIG. 6 is a display screen illustrating an example embodiment of a client child node and a references grandchild node.

FIG. 7 is a display screen illustrating an example embodiment of a matter child node and a claims grandchild node.

FIG. 8 is a display screen illustrating an example embodiment of a matter child node and a prosecution grandchild node.

FIG. 9 is a display screen illustrating an example embodiment of a matter child node and a prosecution grandchild node.

FIG. 10 is a display screen illustrating an example embodiment of a matter child node and a product space grandchild node.

FIG. 11 is a display screen illustrating an example embodiment of a matter child node and a concepts grandchild node.

FIG. 12 is a display screen illustrating an example embodiment of a matter child node and a cited references grandchild node.

FIG. 15 is a block diagram illustrating a machine in the example form of a computer system, within which a set or sequence of instructions for causing the machine to perform any one of the methodologies discussed herein may be executed.

DETAILED DESCRIPTION

Figure 1:
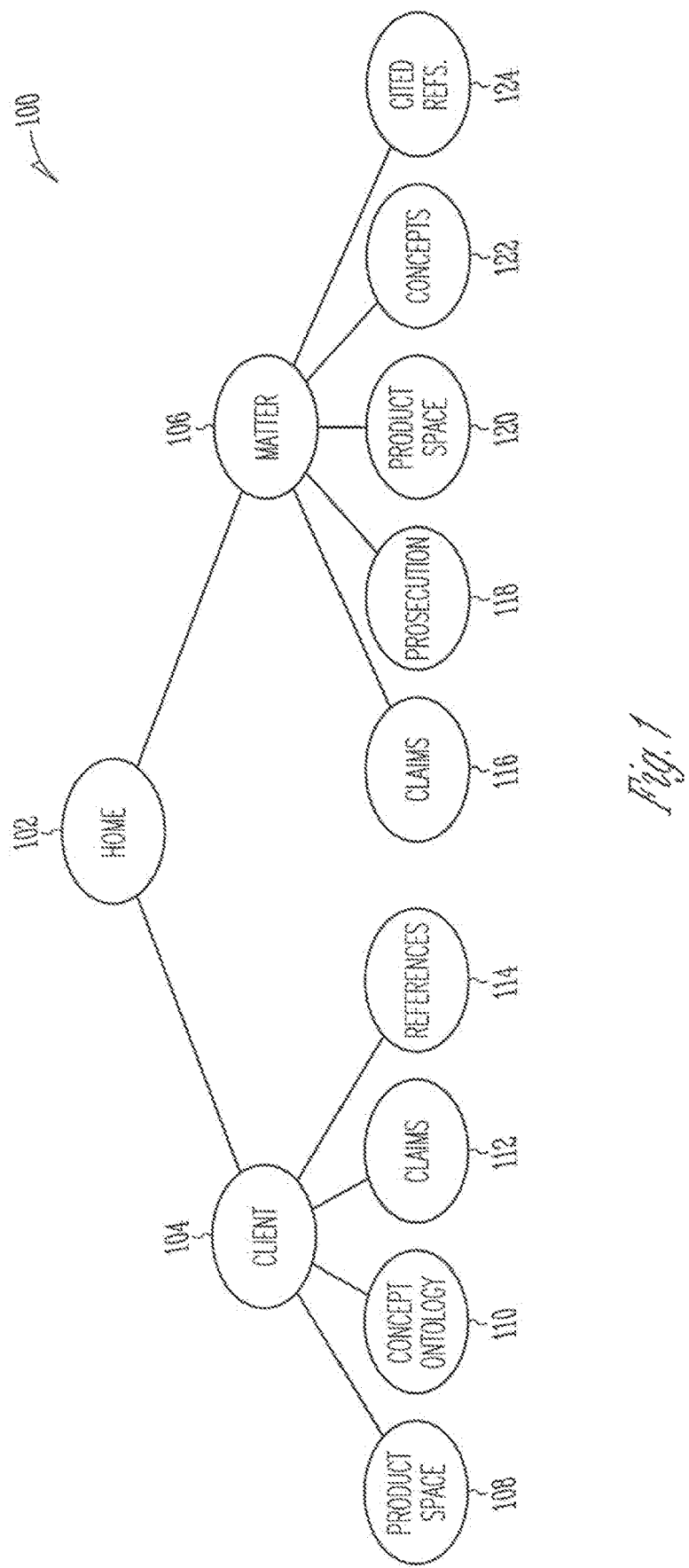
FIG. 1 is a diagram illustrating an example embodiment of a hierarchy used to display client and matter information in a patent information warehouse system.

The following detailed description includes references to the accompanying drawings, which form a part of the detailed description. The drawings show, by way of illustration, specific embodiments in which the invention may be practiced. These embodiments, which are also referred to herein as "examples," are described in enough detail to enable those skilled in the art to practice the invention. The embodiments may be combined, other embodiments may be utilized, or structural, logical and electrical changes may be made without departing from the scope of the present invention. The following detailed description is, therefore, not to be taken in a limiting sense, and the scope of the present invention is defined by the appended claims and their equivalents.

In this document, the terms "a" or "an" are used, as is common in patent documents, to include one or more than one. In this document, the term "or" is used to refer to a nonexclusive or, unless otherwise indicated.

In various embodiments, one or more of the features described below are included to provide a system or method for cross-referencing important intellectual property relationships.

The High Level Purposes of CoreIP are as Follows:
  Map relationships between the following data:
    Claim Space—this is the "atomic" level of IP protection. Claims define what the IP exclusivity is. Claims are the core of patents. While claims belong to patents, we are tracking first and foremost claims, and only secondarily the patents these claims belong to.
    Claim space includes claims as filed, as amended during prosecution, and as allowed and issued.
    Product space—this is the "space" that the business people live in. They think in terms of products and services, product lines, product features, product functions. We want CoreIP to be able to show business people what they have for IP protection with respect to this space, so that they can quickly understand where they stand on IP protection. Also, this capability will allow patent attorneys to see the strategic value of the protection they are getting for the client.
    Claims are mapped to the Product space, so that a user can see which if any claims cover which products/features Concept Space. Claims are made up of concepts. There are Common Concepts and Specialization Concepts
- A concept ontology is provided, having a hierarchy with nodes.
- Claims are indexed/mapped using the ontology
- Claims as a whole are mapped to at least one (or more) of the narrowest nodes in the ontology that is broader than the breadth of the claim.
- A Claimed Concept space can be filtered to eliminate patents that are not of a scope of interest References Space. This is the space of prior art. In particular, the references space includes prior art patents or other prior art teachings, such as prior products or publications.
- References are mapped to claims
- References can also be mapped to the concept space Prosecution History Space. The prosecution space is defined by the prosecution history. In this context, the prosecution space focuses on the history of filed claims, claim amendments, prior art citation and patent office rejections/objections, and attorney arguments.
- Rejections/rejections are mapped to claims
- attorney arguments are mapped to claims and references Using the above indexes and mappings, attorneys will be able to do the following:
- Find all other instances of a reference being cited or argued in the same or another case
- Continuously understand the relationship between the Product Space and the Claims
- Quickly understand the scope of claims by looking at the Concept Space map for a claim
- Quickly find claims of a particular scope by searching and filtering in the Claimed Concept space
- Cross reference Claimed Concept space to the Product Space
- Find References that have been cited against concepts in a particular branch of the Concept space
- View a summary/compact view of the file history space to quickly Sets of Claims The simplest way to track and display claims is to model it as follows:
- claims are tracked as a "Set"
- an application is filed with an Initial Set of claims ("claims as filed")
- if a Set of claims is amended, it is amended on a certain Date
- the Set of allowed claims has an "allowance date"
- a Set of issued claims has an "issue date"

So, claims are grouped in Sets, and each Set has a Date associated with it, and each Date can have a Date Type, like "Filed", "Preliminary Amendment", "Amendment", "Allowed", "Issued"

Thus, we have: Claims in Sets and each Set has a Date and each Date has a Date Type.

Amendment Status of Claims in a Set

Now, for each Claim in each Set, we want to be able to assign an Amendment Status.
The Amendment Status's are as follows:
Filed
Amended—<number> (for example: Amended—1, Amended—2, etc. . . . (allow up to 20 for a number)
Cancelled
New Examination Status of Claims in a Set Now, for each Claim in each Set, we also want to be able to assign an Examination Status.
The Amendment Status's are as follows:
Not Examined
Rejected
Objected to
Allowed
Restricted Out Prior Art Cited Against of Claims in a Set Now, for each Claim in each Set, we also want to be able to track Prior Art Cited against each claim.
The Prior Art Cited for each claim includes the following:
Identify Patent cited
Reason Claim Rejected
  take this text from patent office paperwork Arguments Made in Favor of Patentability In addition, for each claim, we want to keep track of:
all arguments made for patentability with respect to the claim; AND
all arguments made for patentability with respect to a particular prior art Reference In an embodiment, information describing patent applications and related information is displayed within one or more screens on a computer display. The screens may, for example, be child screens in a framed web presentation. In an embodiment, navigational links are provided, such as by tabs at the top of a computer display screen. Using the navigational links or tabs, a user can view refined subsets of information.

FIG. 1 is a diagram illustrating an example embodiment of a hierarchy 100 used to display client and matter information in a patent information warehouse system. In an embodiment, a home node 102, which may have the physical embodiment of a home page in a web page environment, may provide two child nodes (e.g., sub-screens), such as a client node 104 and a matter node 106. In alternative embodiments, fewer or more child nodes are available from the home node 102, such as a search node (not shown), a billing node (not shown), or a reports node (not shown).

At the client node 104, general information regarding is available, such as in a static area of a web page. In addition, one or more grandchild nodes may be provided to allow a user to drill down into further detail regarding the client node 104. In an embodiment, a product space node 108, a concept ontology node 110, a claims node 112, and a references node 114 are provided as children to the client node 104. While, in some example embodiments, the grandchildren node 108-114 may display some of the same or substantially similar information, each grandchild node is designed to display information from a particular perspective.

At the matter node 106, information related to the matter is available, such as the matter name, number, file date, client identification, file status, and the like. In an embodiment, the general information in the matter node 106 is made available using a static area of a web presentation. As with the client node 104, the matter node 106, may have, in various embodiments, one or more related grandchild nodes. In this example embodiment, the matter node 106 has a claims node 116, a prosecution node 118, a product space node 120, a concepts node 122, and a cited references node 124 as related grandchild nodes.

In various embodiments, the grandchild nodes 108-124 may additionally have related great grandchild nodes, which may provide further refined views of related information.

Figure 2:
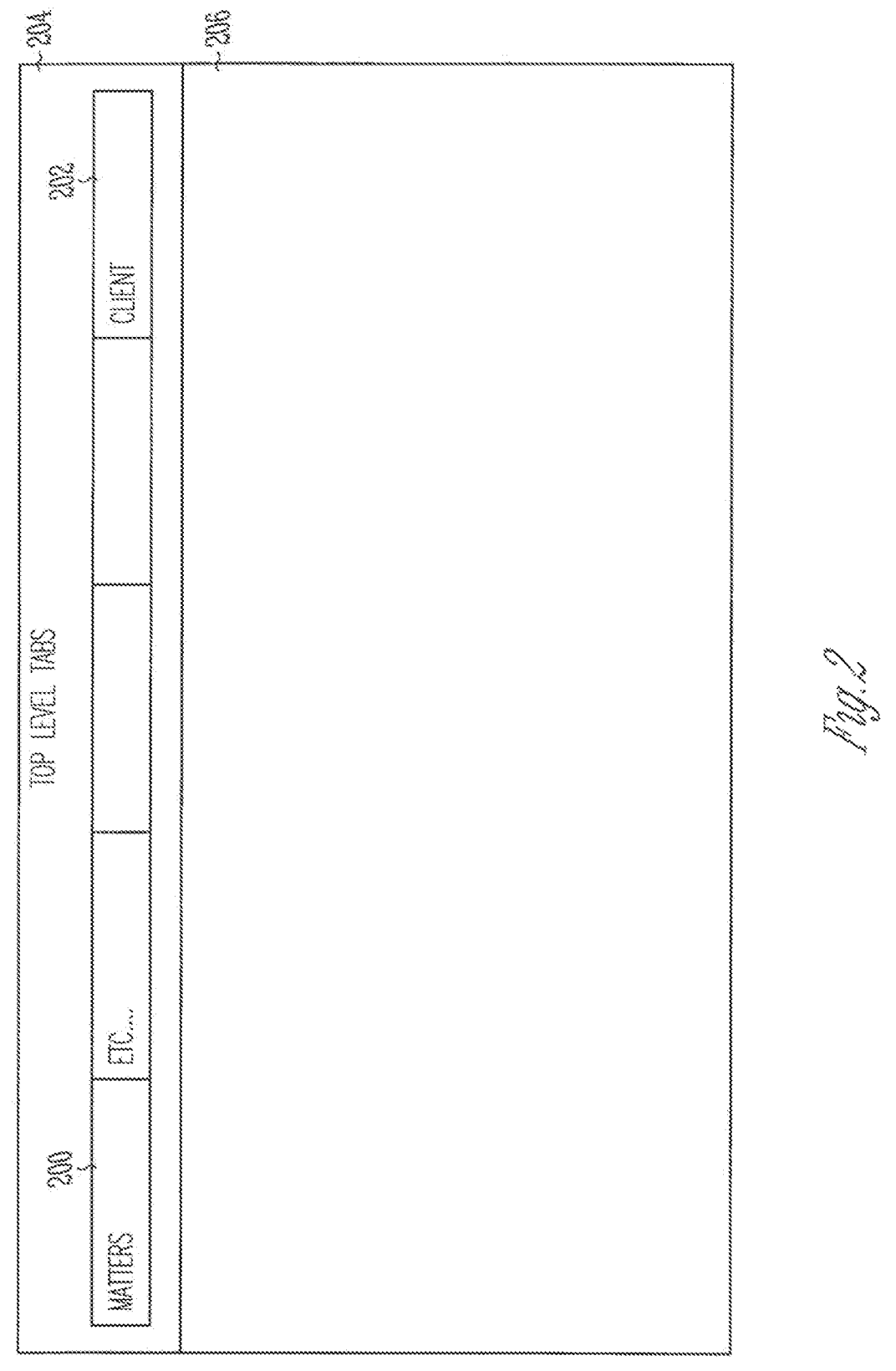

FIG. 2 is a display screen illustrating an example embodiment of a home node 102. In FIG. 2, two or more tabs are provided in a navigational area of a web page. For example, a computer display screen may be divided into two or more areas including a navigational area 204 and a content area 206. The navigational area 204 may include hypertext links, for example in the form of graphical tabs, and form input controls, for example a drop down or text input controls to input search criteria or navigate the browser display. In an example embodiment illustrated in FIG. 2, a matters tab 200 and a client tab 202 are provided to a user. Activating the matters tab 200 may load content into the content area 206.

FIG. 3 is a display screen illustrating an example embodiment of a client child node 104 and a product space grandchild node 108. In FIG. 3, the displayed content may be arranged in the content area 206, as described in FIG. 2, or alternatively, the displayed content may be provided on a new web page or display. In FIG. 3, the content is arranged into two areas, a client information area 300 and a client specific content area 302. In an embodiment, the client information area 300 is a frame in HTML and remains static while the user navigates the client specific information in the client specific content area 302. The client specific information illustrated in FIG. 3 includes product space information. For example, a product space may be described using one or more attributes, such as a product space name or description 304, a product space protection indicia 306, a product space status 308, related claims 310 to each product space, and related patents or patent applications 312 to each product space. In an embodiment, a product space may have a protection indicia of selected, none, or broad. In an embodiment, a product space may have a status of pending, issued, or not available (N/A). In some embodiments, one or more claims may be listed as related to a particular product space. In some embodiments, one or more file numbers, which refer to files, such as patent applications or issued patents, may be listed as related to a particular product space.

FIG. 4 is a display screen illustrating an example embodiment of a client child node 104 and a concept ontology grandchild node 110. In FIG. 4, the displayed content may be arranged in the content area 206, as described in FIG. 2, or alternatively, the displayed content may be provided on a new web page or display. In FIG. 4, as was the case in FIG. 3, the content is arranged into two areas, a client information area 400 and a client specific content area 402. In an embodiment, the client information area 400 is a frame in HTML and remains static while the user navigates the client specific information in the client specific content area 402. The client specific information illustrated in FIG. 4 includes concept ontology information. In various embodiments, the concept ontology is represented as a graph, including nodes that represent concepts, and lines or arrows connecting the nodes that represent relationships. In alternative embodiments, the concept ontology is represented in a chart or structured list, where a genus concept is arranged in a position relative to its related species concepts. For example, a concept ontology may be represented as a bulleted list, where each species is listed under its related genus.

FIG. 5 is a display screen illustrating an example embodiment of a client child node 104 and a claims grandchild node 112. In FIG. 5, the displayed content may be arranged in the content area 206, as described in FIG. 2, or alternatively, the displayed content may be provided on a new web page or display. In FIG. 5, as was the case in FIG. 3, the content is arranged into two areas, a client information area 500 and a client specific content area 502. In an embodiment, the client information area 500 is a frame in HTML and remains static while the user navigates the client specific information in the client specific content area 502. The client specific information illustrated in FIG. 5 includes information about related claims. For example, related information may include an application or patent name or description 504, one or more related claims 506, a product space 508, a status 510, and related concepts 512. In an embodiment, a claim may have a protection indicia of selected, none, or broad. In an embodiment, claims may have a status of pending, issued, or not applicable (NA). In some embodiments, one or more concepts may be listed as related to a particular claim.

FIG. 6 is a display screen illustrating an example embodiment of a client child node 104 and a references grandchild node 114. In FIG. 6, the displayed content may be arranged in the content area 206, as described in FIG. 2, or alternatively, the displayed content may be provided on a new web page or display. In FIG. 6, as was the case in FIG. 3, the content is arranged into two areas, a client information area 600 and a client specific content area 602. In an embodiment, the client information area 600 is a frame in HTML and remains static while the user navigates the client specific information in the client specific content area 602. The client specific information illustrated in FIG. 6 includes information about related references. For example, each related reference 604 may include information showing a claim 606 the reference was cited against, a patent or application identifier 608 where the reference was used, an alleged teaching 610 of the reference, for example by an examiner in an office action, an applicant's arguments 612, for example in an attempt to overcome the alleged teaching 610, and a status 614 of the reference's use in the particular patent or application 608 for the particular claim 604. In an embodiment, a status may include an indicia that the applicant's argument was rejected, accepted, declared moot, or is pending.

FIG. 7 is a display screen illustrating an example embodiment of a matter child node 106 and a claims grandchild node 116. In FIG. 7, the displayed content may be arranged in the content area 206, as described in FIG. 2, or alternatively, the displayed content may be provided on a new web page or display. In FIG. 7, the content is arranged into two areas, a matter information area 700 and a matter specific content area 702. In an embodiment, the matter information area 700 is a frame in HTML and remains static while the user navigates the matter specific information in the matter specific content area 702. The matter specific information illustrated in FIG. 7 includes information about related claims. For example, each related claim may be grouped by claim sets, organized by when a claim was filed, and include a status of the claim or claim set. Information about related claims may be organized, for example, to include a claim identification or description 704, a related product space 706, and related claims or claim sets 708. In an embodiment, the claim identification of description includes a date and a date type. A date type may include "Filed", "Preliminary Amendment", "Amendment", "Allowed", or "Issued" dates.

In addition, in some example embodiments, additional claim sets 710 and related information are displayed and described in the same display.

FIG. 8 is a display screen illustrating an example embodiment of a matter child node 106 and a prosecution grandchild node 118. In FIG. 8, the displayed content may be arranged in the content area 206, as described in FIG. 2, or alternatively, the displayed content may be provided on a new web page or display. In FIG. 8, the content is arranged into two areas, a matter information area 800 and a matter specific content area 802. In an embodiment, the matter information area 800 is a frame in HTML and remains static while the user navigates the matter specific information in the matter specific content area 802. The matter specific information illustrated in FIG. 8 includes information about prosecution history. In some example embodiments, two or more views are provided, such as a condensed view and an expanded view. For example, in a condensed view, such as the one illustrated in FIG. 8, claim numbers only or hypertext links may be used to conserve display screen space. In another example, an expanded or detailed view may include some or all of the text for a particular field. In the example illustrated in FIG. 8, each claim may be grouped by claim sets 804, organized by when a claim was filed, and include a status of the claim or claim set. Information about related claims may be organized, for example, to include an amendment status 806, an examination status 808, related art cited 810, reasons for an Patent and Trademark Office Examiner's position 812, and any arguments by the applicant 814. In addition, in some example embodiments, additional claim sets and related information are displayed and described in the same display. In an embodiment, the examination status 808 includes allowed, rejected, unamended, or objected to.

FIG. 9 is a display screen illustrating an example embodiment of a matter child node 106 and a prosecution grandchild node 118. FIG. 9 is an example of an expanded or detailed view of the information provided in FIG. 8. For example, claims, represented by their claim number in the collapsed view illustrated in FIG. 8, are displayed in some or all of the text of the claim in the expanded or detailed view in FIG. 9.

FIG. 10 is a display screen illustrating an example embodiment of a matter child node 106 and a product space grandchild node 120. In FIG. 10, the displayed content may be arranged in the content area 206, as described in FIG. 2, or alternatively, the displayed content may be provided on a new web page or display. In FIG. 10, the content is arranged into two areas, a matter information area 1000 and a matter specific content area 1002. In an embodiment, the matter information area 1000 is a frame in HTML and remains static while the user navigates the matter specific information in the matter specific content area 1002. The matter specific information illustrated in FIG. 10 includes information about related product space. In the example illustrated in FIG. 10, each product space 1004 may include attributes, such as an indicia of protection 1006, a status 1008, and related claims 1010. In an embodiment, the indicia of protection 1006 may include selected, none, or broad. In an embodiment, the status 1008 may include pending, issued, or not applicable (NA). In various embodiments, related claims 1010 may be listed by claim number or an indicia of a claim set and a claim number.

FIG. 11 is a display screen illustrating an example embodiment of a matter child node 106 and a concepts grandchild node 122. In FIG. 11, the displayed content may be arranged in the content area 206, as described in FIG. 2, or alternatively, the displayed content may be provided on a new web page or display. In FIG. 11, the content is arranged into two areas, a matter information area 1100 and a matter specific content area 1102. In an embodiment, the matter information area 1100 is a frame in HTML and remains static while the user navigates the matter specific information in the matter specific content area 1102. The matter specific information illustrated in FIG. 11 includes information about concepts related to the matter. In the example illustrated in FIG. 11, each concept 1104 may include one or more related claims 1106. In an embodiment, if a concept 1104 exists in a claim 1106, then an indicia, such as a check mark or an "x," is provided in the intersecting portion of the table.

FIG. 12 is a display screen illustrating an example embodiment of a matter child node 106 and a cited references grandchild node 124. In FIG. 12, the displayed content may be arranged in the content area 206, as described in FIG. 2, or alternatively, the displayed content may be provided on a new web page or display. In FIG. 12, the content is arranged into two areas, a matter information area 1200 and a matter specific content area 1202. In an embodiment, the matter information area 1200 is a frame in HTML and remains static while the user navigates the matter specific information in the matter specific content area 1202. The matter specific information illustrated in FIG. 12 includes information about cited references related to the matter. In the example illustrated in FIG. 12, each cited reference 1204 may include one or more related claims 1206, an alleged teaching 1208 related to each claim 1206, an applicant's argument 1210, and a status 1212. In an embodiment, a status may include an indicia that the applicant's argument was rejected, accepted, declared moot, or is pending.

Figure 13:
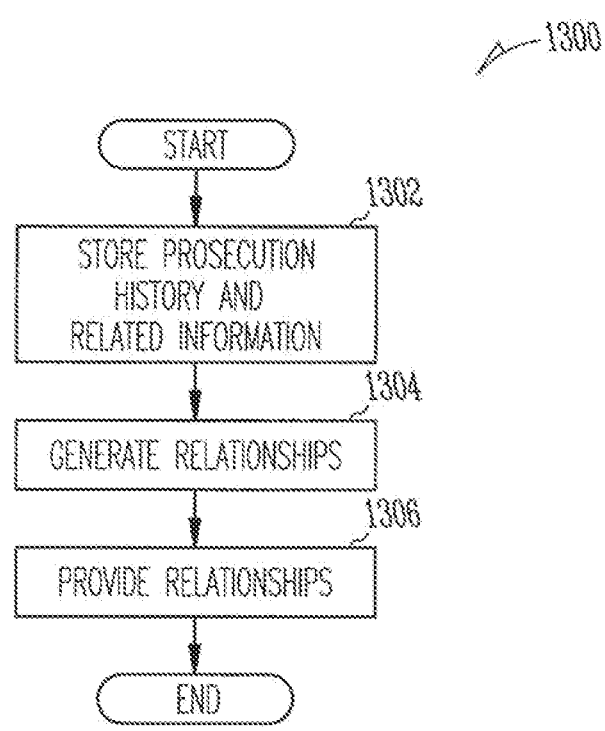
FIG. 13 is a flowchart illustrating a method of cataloging and providing intellectual property information, in accordance with an example embodiment.

FIG. 13 is a flowchart illustrating a method 1300 of cataloging and providing intellectual property information, in accordance with an example embodiment. At 1302, information is collected and stored. Information may include data related to a patent portfolio, such as concepts, products, product spaces, patents, references, and the like. Information may also include prosecution history related to the patents or references. At 1304, relationships are generated. Relationships may include mappings between a claim and a reference, a claim and a concept, or the like. At 1306, one or more of the relationships are provided. In an embodiment, the relationships are provided using a graphical user interface, such as a web browser.

Figure 14:
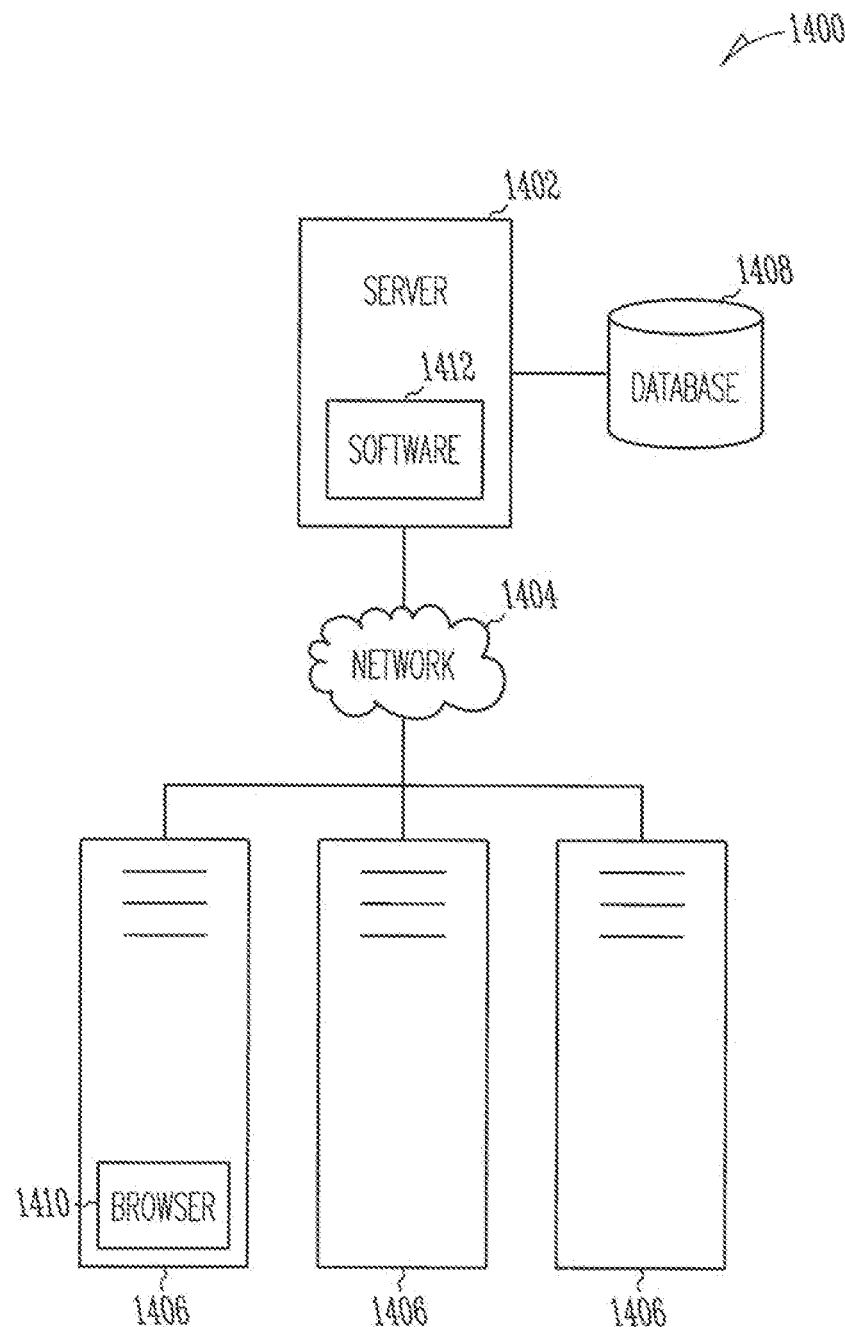
FIG. 14 is a diagram illustrating a client-server networked environment, in accordance with an example embodiment.

FIG. 14 is a diagram illustrating a client-server networked environment 1400, in accordance with an example embodiment. Embodiments of the inventive subject matter may find application in many different types of computer-based or network-based facilities or systems. Accordingly, the example embodiment is not intended to limit the scope of the inventive subject matter solely to such systems.

In an embodiment, the client-server networked environment 1400 includes a web server 1402, which can communicate over a network 1404 to a client computer 1406. The web server 1402 additionally can communicate using one or more direct or networked connections with other servers, such as an application server (not shown), an email server (not shown), and a database management server (not shown). In addition, a database 1408 is communicatively coupled to the network 1404.

In an embodiment, the client-server networked environment 1400 is accessed by a client program, for example a browser 1410 (e.g., Internet Explorer distributed by Microsoft Corp. of Redmond, Wash.) that executes on the client computer 1406 and accesses the web server 1402 via the network 1404. In various embodiments, the network 1404 may include the Internet, a wide area network (WAN), a local area network (LAN), a wireless network (e.g., a cellular network), the Public Switched Telephone Network (PSTN) network, or the like.

In an embodiment, the web server 1402 uses software 1412 to receive a request from a client computer 1406, where in response to the request, the web server 1402 accesses the database 1408 and provides information to the client computer 1406. The information may include intellectual property information, as described above.

FIG. 15 is a block diagram illustrating a machine in the example form of a computer system 1500, within which a set or sequence of instructions for causing the machine to perform any one of the methodologies discussed herein may be executed. In alternative embodiments, the machine may comprise a computer, a network router, a network switch, a network bridge, Personal Digital Assistant (PDA), a cellular telephone, a web appliance, set-top box (STB) or any machine capable of executing a sequence of instructions that specify actions to be taken by that machine.

The computer system 1500 includes a processor 1502, a main memory 1504 and a static memory 1506, which communicate with each other via a bus 608. The computer system 1500 may further include a video display unit 1510 (e.g., a liquid crystal display (LCD) or a cathode ray tube (CRT)). The computer system 1500 also includes an alphanumeric input device 1512 (e.g., a keyboard), a cursor control device 1514 (e. g., a mouse), a disk drive unit 1516, a signal generation device 1518 (e.g., a speaker) and a network interface device 1520 to interface the computer system to a network 1522.

The disk drive unit 1516 includes a machine-readable medium 1524 on which is stored a set of instructions or software 1526 embodying any one, or all, of the methodologies described herein. The software 1526 is also shown to reside, completely or at least partially, within the main memory 1504 and/or within the processor 1502. The software 1526 may further be transmitted or received via the network interface device 1520. For the purposes of this specification, the term "machine-readable medium" shall be taken to include any medium which is capable of storing or encoding a sequence of instructions for execution by the machine and that cause the machine to perform any one of the methodologies of the inventive subject matter. The term "machine-readable medium" shall accordingly be taken to include, but not be limited to, solid-state memories, optical and magnetic disks, and carrier wave signals. Further, while the software is shown in FIG. 15 to reside within a single device, it will be appreciated that the software could be distributed across multiple machines or storage media, which may include the machine-readable medium.

The foregoing description of specific embodiments reveals the general nature of the inventive subject matter sufficiently that others can, by applying current knowledge, readily modify and/or adapt it for various applications without departing from the generic concept. Therefore, such adaptations and modifications are within the meaning and range of equivalents of the disclosed embodiments. The phraseology or terminology employed herein is for the purpose of description and not of limitation. Accordingly, the inventive subject matter embraces all such alternatives, modifications, equivalents and variations as fall within the spirit and broad scope of the appended claims.

Method embodiments described herein may be computer-implemented. Some embodiments may include computer-readable media encoded with a computer program (e.g., software), which includes instructions operable to cause an electronic device to perform methods of various embodiments. A software implementation (or method) may include microcode, assembly language code, or a higher-level language code, which further may include computer readable instructions for performing various methods. The code may form portions of computer program products. Further, the code may be tangibly stored on one or more volatile or non-volatile computer-readable media during execution or at other times. These computer-readable media may include, but are not limited to, hard disks, removable magnetic disks, removable optical disks (e.g., compact disks and digital video disks), magnetic cassettes, memory cards or sticks, random access memories (RAMS), read only memories (ROMs), and the like.

It is to be understood that the above description is intended to be illustrative and not restrictive. For example, the above-described embodiments (and/or aspects thereof) may be used in combination with each other. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract is provided to comply with 37 C.F.R. § 1.72(b), which requires that it allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment.

What is claimed is:

1. A method comprising:
   maintaining, in a storage device, a database that includes client specific information, wherein the client specific information identifies at least one product space by a product name or description of a product feature, one or more patent claims, a protection indicia corresponding to a respective product space of the at least one product space, and a status of a patent claim of the one or more patent claims, wherein the protection indicia indicates the client's patent protection for the respective product space as one of selected, broad, or none;
   mapping an association between one or more patent claims and the respective product space of the at least one product space;
   displaying on at least one display device a user interface with at least two portions, including a first portion that includes a plurality of user interface elements that include a product space user interface element;

receiving an indication via at least one user input device that the product space user interface has been selected for a client;

in response to the selection, executing a query to retrieve a list of product spaces for the client; patent claims associated with the list of product spaces based on maps included in the database that include respective of the product spaces, the protection indicia corresponding to each product space in the list of product spaces, and a list of statuses of the patent claims associated with the list of product spaces from the database from the at least one storage device; and updating the user interface to include a product space view that includes the list of product spaces, the patent claims; the protection indicia corresponding to each product space in the list of product spaces, and the list of statuses.

2. The method of claim 1, wherein the database further includes at least one patent application identification corresponding with a respective product space of the at least one product space, and wherein the product space view further includes a list of patent application identifications associated with the list of product spaces retrieved from the at least one database.

3. The method of claim 1, detecting a selection of a patent claims user interface element in the plurality of user interface elements for the client; and in response to the selection of the patent claims user interface element, retrieving a list of patent applications corresponding to the client and a list of claims associated with the list of patent applications from the database from the at least one storage device; and displaying, in the second portion of the user interface, a claim view that includes the list of patent applications corresponding to the client and the list of claims associated with the list of patent applications.

4. The method of claim 3, wherein the claim view further includes:

a list of product spaces associated with the list of claims.

5. The method of claim 3, wherein the claim view further includes:

a list of statuses associated with the list of claims.

6. The method of claim 3, wherein the claim view further includes:

a list of the concepts associated with the list of claims.

7. A system comprising:

at least one storage device that stores a database that includes diem specific information, wherein the client specific information identifies at least one product space by a product name or by a description of a product feature, one or more patent claims, a protection indicia corresponding to a respective product space of the at least one product space; and a status of a patent claim of the one or more patent claims, wherein the protection indicia indicates the client's patent protection for the respective product space as one of selected, broad, or none;

at least one display device to display a user interface with at least two portions including a first portion that includes a plurality of user interface elements including a product space user interface element;

at least one input device to detect a selection of the product space user interface element for a client; and at least one processor to:

map an association between one or more patent claims and the respective product space of the at least one product space;

in response to the selection, execute a query to retrieve a list of product spaces for the client, patent claims associated with the list of product spaces based on maps included in the database that include respective of the product spaces, the protection indicia corresponding to each product space in the list of product spaces, and a list of statuses of the patent claims associated with the list of product spaces from the database from the at least one storage device; and transmit data to the display device to display, in a second portion of the user interface, a product space view that includes the list of product spaces, the patent claims, the protection indicia corresponding to each product space in the list of product spaces, and the list of statuses.

8. The system of claim 7, wherein the database further includes at least one patent application identification corresponding with a respective product space of the at least one product space, and wherein the data transmitted to the display device to display in the second portion further includes a list of patent application identifications associated with the list of product spaces retrieved from the at least one database.

9. The system of claim 7, wherein the plurality of user interface elements include a patent claims user interface element;

wherein the input device is further to detect a selection of patent claims user interface element for the client;

where the at least one processor to, in response to the selection of the patent claims user interface element:

execute a query to retrieve a list of patent applications corresponding to the client and a list of claims associated with the list of patent applications from the database from the at least one storage device; and transmit data to the display device to display, in the second portion of the user interface, a claim view that includes the list of patent applications corresponding to the client and the list of claims associated with the list of patent applications.

10. The system of claim 9, wherein the claim view further includes:

a list of product spaces associated with the list of claims.

11. The system of claim 9, wherein the claim view further includes:

a list of statuses associated with the list of claims.

12. The system of claim 9, wherein the claim view further includes:

a list of the concepts associated with the list of claims.

13. A non-transitory computer-readable medium with instructions stored thereon, which when executed by a least one processor, configure the at least one processor to perform operations comprising:

maintaining, in a storage device, a database that includes client specific information, wherein the client specific information identifies at least one product space by a product name or description of a product feature, one or more patent claims, a protection indicia corresponding to a respective product space of the at least one product space, and a status of a patent claim of the one or more patent claims, wherein the protection indicia indicates the client's patent protection for the respective product space as one of selected, broad, or none;

mapping an association between one or more patent claims and the respective product space of the at least one product space;

displaying on at least one display device a user interface with at least two portions, including a first portion that includes a plurality of user interface elements that include a product space user interface element;

receiving an indication via at least one user input device that the product space user interface has been selected for a client;

in response to the selection, executing a query to retrieve a list of product spaces for the client, patent claims associated with the list of product spaces based on maps included in the database that include respective of the product spaces; the protection indicia corresponding to each product space in the list of product spaces, and a list of statuses of the patent claims associated with the list of product spaces from the database from the at least one storage device; and updating the user interface to include a product space view that includes the list of product spaces, the patent claims, the protection indicia corresponding to each product space in the list of product spaces, and the list of statuses.

14. The non-transitory computer-readable medium of claim 13; comprising further instructions to:

detecting a selection of a patent claims user interface element in the plurality of user interface elements for the client; and in response to the selection of the patent claims user interface element, retrieving a list of patent applications corresponding to the client and a list of claims associated with the list of patent applications from the database from the at least one storage device; and displaying; in the second portion of the user interface; a claim view that includes the list of patent applications corresponding to the client and the list of claims associated with the list of patent applications.

15. The non-transitory computer-readable medium of claim 14, wherein the claim view further includes:

a list of product spaces associated with the list of claims.

16. The non-transitory computer-readable medium of claim 14, wherein the claim view further includes:

a list of statuses associated with the list of claims.

17. The non-transitory computer-readable medium of claim 14, wherein the claim view further includes:

a list of the concepts associated with the list of claims.

* * * * *

UNITED STATES PATENT AND TRADEMARK OFFICE
CERTIFICATE OF CORRECTION

PATENT NO. : 10,810,693 B2
APPLICATION NO. : 14/750559
DATED : October 20, 2020
INVENTOR(S) : Lundberg et al.

Page 1 of 1

It is certified that error appears in the above-identified patent and that said Letters Patent is hereby corrected as shown below:

In the Claims

In Column 11, Line 5, in Claim 1, delete "client;" and insert --client,-- therefor In Column 11, Line 15, in Claim 1, delete "claims;" and insert --claims,-- therefor In Column 11, Line 51, in Claim 7, delete "diem" and insert --client-- therefor In Column 11, Line 56, in Claim 7, delete "space;" and insert --space,-- therefor In Column 13, Line 15, in Claim 13, delete "spaces;" and insert --spaces,-- therefor In Column 14, Line 2, in Claim 14, delete "13;" and insert --13,-- therefor In Column 14, Line 11, in Claim 14, delete "displaying;" and insert --displaying,-- therefor In Column 14, Line 11, in Claim 14, delete "interface;" and insert --interface,-- therefor Signed and Sealed this
Fifth Day of January, 2021

Andrei Iancu
*Director of the United States Patent and Trademark Office*